United States Patent
Ludwig

(10) Patent No.: US 7,524,520 B2
(45) Date of Patent: *Apr. 28, 2009

(54) METHOD OF PROCESSING OF MEAT

(75) Inventor: Wolfgang Ludwig, Kingston, NY (US)

(73) Assignee: Wolf-Tec, Inc., Kingston, NY (US)

( * ) Notice: Subject to any disclaimer, the term of this patent is extended or adjusted under 35 U.S.C. 154(b) by 452 days.

This patent is subject to a terminal disclaimer.

(21) Appl. No.: 10/782,007

(22) Filed: Feb. 12, 2004

(65) Prior Publication Data

US 2004/0166229 A1 Aug. 26, 2004

Related U.S. Application Data

(62) Division of application No. 09/808,398, filed on Mar. 14, 2001, now abandoned.

(60) Provisional application No. 60/189,667, filed on Mar. 15, 2000.

(51) Int. Cl.
*A23L 1/318* (2006.01)

(52) U.S. Cl. .................. 426/233; 426/443; 426/506; 426/519; 426/520; 426/524

(58) Field of Classification Search .............. 426/231, 426/233, 641, 443, 465, 506, 519, 520, 524
See application file for complete search history.

(56) References Cited

U.S. PATENT DOCUMENTS

| | | | | |
|---|---|---|---|---|
| 3,718,485 A | * | 2/1973 | Lankford | 426/438 |
| 4,120,981 A | | 10/1978 | Burkhart | |
| RE31,833 E | | 2/1985 | Loeffler et al. | |
| 4,994,294 A | | 2/1991 | Gould | |
| 5,139,345 A | | 8/1992 | Schafer et al. | |
| 5,158,794 A | * | 10/1992 | Halden et al. | 426/281 |
| 5,405,630 A | | 4/1995 | Ludwig | |
| 5,564,332 A | * | 10/1996 | Ludwig | 99/472 |
| 5,741,536 A | * | 4/1998 | Mauer et al. | 426/520 |
| 6,105,490 A | | 8/2000 | Horn et al. | |
| 6,145,432 A | | 11/2000 | Bellue, Jr. | |
| 6,730,341 B2 | | 5/2004 | Ludwig | |
| 2002/0006457 A1 | | 1/2002 | Ludwig | |

FOREIGN PATENT DOCUMENTS

DE 3119496 A * 12/1982
WO WO 96/36233 11/1996

* cited by examiner

*Primary Examiner*—Drew E Becker
(74) *Attorney, Agent, or Firm*—Boyle Fredrickson, S.C.

(57) ABSTRACT

The water holding capacity of meat is improved by agitating the meat at an elevated temperature with the processing solution and by maintaining the elevated temperature with precision. A preferred temperature is in the range of 45° to 60° F. and the agitation is preferably a massaging action after injection of the liquid into the meat.

15 Claims, 3 Drawing Sheets

METHOD OF PROCESSING OF MEAT

CROSS REFERENCE TO RELATED APPLICATIONS

This application is a divisional of Ser. No. 09/808,398 filed 14 Mar. 2001, now abandoned, which claims the benefit of Provisional Application 60/189,667 filed 15 Mar. 2000.

FIELD OF THE INVENTION

My present invention relates to an apparatus for processing meat wherein the bodies or pieces of meat are contacted with a treating liquid and the bodies of meat are agitated to distribute the treating liquid in the meat. More particularly, the invention relates to the treatment of meat utilizing a massaging of the meat following an injection of a liquid, usually in the form of an aqueous solution, into the meat.

BACKGROUND OF THE INVENTION

In U.S. Pat. No. 5,564,332, there is described a paddle massager in which pieces of meat can be subjected to a massaging action to distribute an aqueous solution, which has been injected into the meat, uniformly throughout the tissue thereof. A prior patent dealing with such massaging action is U.S. Pat. No. 5,405,630. A plant utilizing such a paddle massager and a maceration of the meat product before it enters the massager is described in U.S. Pat. No. 5,972,398.

In prior massaging techniques, it has generally been thought that the massaging action should be carried out cold, i.e. at a relatively low temperature which is maintained by circulating a coolant through the jacket of the machine. A typical temperature of this cooling liquid, which is generally a glycol/water solution, can be about 23° F.

The massaging action is intended to uniformly distribute the treating solution into the muscle tissue of the meat. The solution can be a brine and normally includes phosphates, nitrate, nitrite, salt, flavor enhancers, proteins, binders fats or other meat treating agents such as preservatives.

The tradition has been to inject the meat with the solution, usually with needles under an elevated pressure under conditions in which the meat is normally cold at the time it is injected and the injectable solution itself is relatively cold. It is desirable to conduct the massaging action so that the product emerges from the massager in a relatively dry state, i.e. the marinade or treating solution is fully taken up within the body of the meat, leaving the surface free from or practically free from a liquid film.

These techniques have been used for all sorts of meats, including beef, pork, lamb and veal, and for practically any cut of meat in which a substantial body of meat must be tenderized or treated, for example, roasts, hams, shanks, loins and the like.

However, earlier systems have been found to involve a number of problems. For example, it has been found that, with conventional systems, a phenomenon may develop which can impede effective massaging. For example proteins released from the meat tend to bind with water of the treatment solution at a given temperature (depending on the composition of the treatment solution) and form a compound. This compound may be exuded from the body of the meat and act as an external coating or internal barrier. In either case, this compound impairs penetration, absorption and/or dispersion of the treatment solution throughout the cross section of the body and the result is an unaesthetic surface. It has been noted, further, that meat products which are treated cold following the injection may not develop the uniform internal coloration which is desired for many cuts of meat. Furthermore, the protein/water coating on the body of meat tends to reduce friction and thus the massaging effectiveness so that longer massaging operations may be required.

Still another drawback of earlier systems appears to be the limited breakdown of treating solutions like polyphosphates and nitrites by enzymes present in the meat so that such additives to the inject are not utilized completely or efficiently.

OBJECTS OF THE INVENTION

It is, therefore, the principal object of the present invention to provide an improved method of treating or processing meat involving contact of a treating liquid with the meat, whereby drawbacks of earlier systems are obviated.

More specifically, it is an object of this invention to effect the agitation of meat (e.g. the massaging and/or tumbling) so that the agitation takes place more efficiently, with a better yield, from the point of view of the solution used and with higher quality results.

SUMMARY OF THE INVENTION

These objects are attained, in accordance with the invention by a method which comprises contacting bodies of meat with a treating solution; agitating the bodies of meat in contact with the treatment solution at an elevated temperature until the bodies of meat are substantially dry; and recovering the bodies of meat in a substantially dry state. I have found that the elevated temperature should be in the range of 45° F. to 60° F.

More particularly the method can comprise the steps of:

(a) contacting bodies of meat with a treating solution;

(b) heating the bodies of meat in contact with the treating solution in an agitator to a predetermined elevated temperature and maintaining the temperature substantially constant while agitating the meat for a period of time sufficient to distribute the treating solution in the meat;

(c) thereafter cooling the bodies of meat in the agitator while continuing to agitate the meat; and (d) recovering the bodies of meat in a substantially dry state from the agitator.

While within the broad concepts of my invention, any type of agitator can be used, the preferred agitator is a massager or tumbler. Similarly, my invention contemplates contacting the meat with the liquid in any suitable fashion, but injection at a lower temperature than the elevated temperature mentioned is preferred.

Thus, according to the invention, the bodies of meat can be contacted with the treating solution by injecting the bodies of meat with an inject at a temperature less than the elevated temperature and the agitator is preferably a rotary paddle massager or a tumbler. The elevated temperature is preferably between substantially 45° F. and 60° F., the temperature less than the elevated temperature is substantially 15° to 40° F. below the elevated temperature and the meat is cooled by 15° to 40° F. below the elevated temperature in step (c).

An important aspect of the invention is the control of the temperature at which the agitation takes place. I have found that, in the past, because of different temperatures of the bodies of meat from earlier stages, different temperatures of the liquids used and, in general, the high variability at which processing occurred, the results were highly unpredictable, not reproducible and often unsatisfactory. When the elevated temperature of the present invention is used and that temperature is controlled to, say, ±2° F., problems are eliminated and excellent meat qualities with high and reproducible water holding capacity are obtained.

The elevated temperature is controlled in step. (b) by measuring directly a temperature of the bodies of meat in the agitator and regulating a temperature of the agitator in response to the measured temperature.

The temperature of the bodies of meat in the agitator can be measured for example by causing the bodies of meat to contact directly a temperature sensor mounted in a wall of the agitator. Alternatively the temperature of the bodies of meat in the agitator can be measured by inserting a temperature measuring sensor into bodies of meat in the agitator.

The bodies of meat can be selectively heated and cooled in the agitator by selectively passing a heated or cooled fluid through a jacket thereof.

According to another feature of the invention an apparatus for processing meat can comprise a vessel for receiving bodies of meat in contact with a treating liquid and for agitating the bodies of meat to distribute the treating liquid in the bodies of meat, and means for selectively heating and cooling the vessel during the agitation of the bodies of meat therein. Preferably the vessel has a jacket and the means for selectively heating and cooling the vessel comprises a refrigeration unit for circulating a cooling liquid through the jacket and a heater for passing a heating liquid through the jacket. A temperature sensor can be positioned for direct contact with bodies of meat in the vessel and operatively connected to the means for selectively heating and cooling the vessel for controlling a temperature of the vessel during the agitation of the bodies of meat therein. For instance the temperature sensor can extend through a wall of the vessel and can be thermally insulated therefrom to respond directly to a surface temperature of bodies of meat in the vessel. Alternatively, the temperature sensor is provided with a member capable of being thrust into the vessel to pierce a body of meat therein. In the latter case, this member can have a plurality of sensing regions along a length thereof for providing an average temperature of the body of meat through a thickness thereof.

When a massager is used it is advantageous to control the massaging operation at least in the first stages in response to a measured temperature of a body of meat in the massager. For that purpose, the surface temperature can be measured and the heating and cooling liquid fed through the jacket can be controlled in response to that temperature so that should the temperature rise the heating liquid supply can be cut-off until the temperature falls by transfer of heat to the interior of the body of meat or a cooling flow of liquid to the jacket can be initiated.

It has been found to be more advantageous, however, to provide a probe having a plurality of spaced apart sensors and to insert that probe into a body of meat within the massager after *the latter has been brought to standstill and to use the higher temperature of those measured in the case or the body is to be cooled or the lower temperature of those measured in the case where the body is to be heated as an indication of the internal temperature of the piece of meat where an average may not be a desirable basis for control.

According to another feature of the invention the massager has a jacket through which a temperature-control liquid is circulated, and the temperature-control liquid is initially heated and then cooled in successive steps.

Alternatively, the massager can have a jacket through which a temperature-control liquid is circulated, the method further comprising the steps of separately heating and cooling portions of the temperature-control liquid, feeding heated temperature-control liquid through the jacket during the heating step, and then rapidly cooling bodies of meat by switching the jacket to receive a cooled portion of the temperature-control liquid.

A preferred apparatus according to the invention can comprise:

a support;

a drum on the support for receiving bodies of meat injected with an aqueous solution, for retaining the bodies of meat for massaging of the solution into the meat, and for discharging massaged bodies of meat;

means rotatable at a variable number of rotations per minute for massaging the bodies of meat in the drum;

a temperature-control jacket on the drum; and means for selectively circulating a heated and a cooled liquid through the jacket to selectively heat and cool the bodies of meat during the massaging thereof.

The programming means for the massager is connectable to the rotatable means and the means for selectively circulating for programming the apparatus to:

raise a temperature of the bodies of meat to a relatively high temperature while massaging the bodies of meat at a certain rate of speed of the rotatable means, maintain the bodies of meat at the relatively high temperature for a predetermined time period while continuing to massage the aqueous solution into the meat for a certain time period, cool the bodies of meat to a temperature substantially below the relatively high temperature while continuing to massage the aqueous solution into the meat at a certain rate of speed of the rotatable means, and maintain the bodies of meat at the temperature below the relatively high temperature for a certain time period while continuing to massage the aqueous solution into the meat for a certain period.

One of the major advantages of the present invention is that holding the meat at a higher temperature than is typically used results in a more rapid, thorough and equal (uniform) distribution of the liquid within the meat and substantially reduced formation of a protein/water film on the surface of the meat. Furthermore, the increased temperature of massaging at the initial stage tends to promote the breakdown of ingredients or additives such as polyphosphates and nitrate by enzymes in the meat and hence a greater effectiveness of these components of the treating solution with a more uniform product especially a deeper and more uniform coloration. Because the body of meat is free from the friction reducing film, massaging can be completed more rapidly. Massaging is completed more efficiently, even when the temperature is reduced in the subsequent stage massaging; problems with enzyme coating of the meat do not arise. The product is obtained in a practically dry stage.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
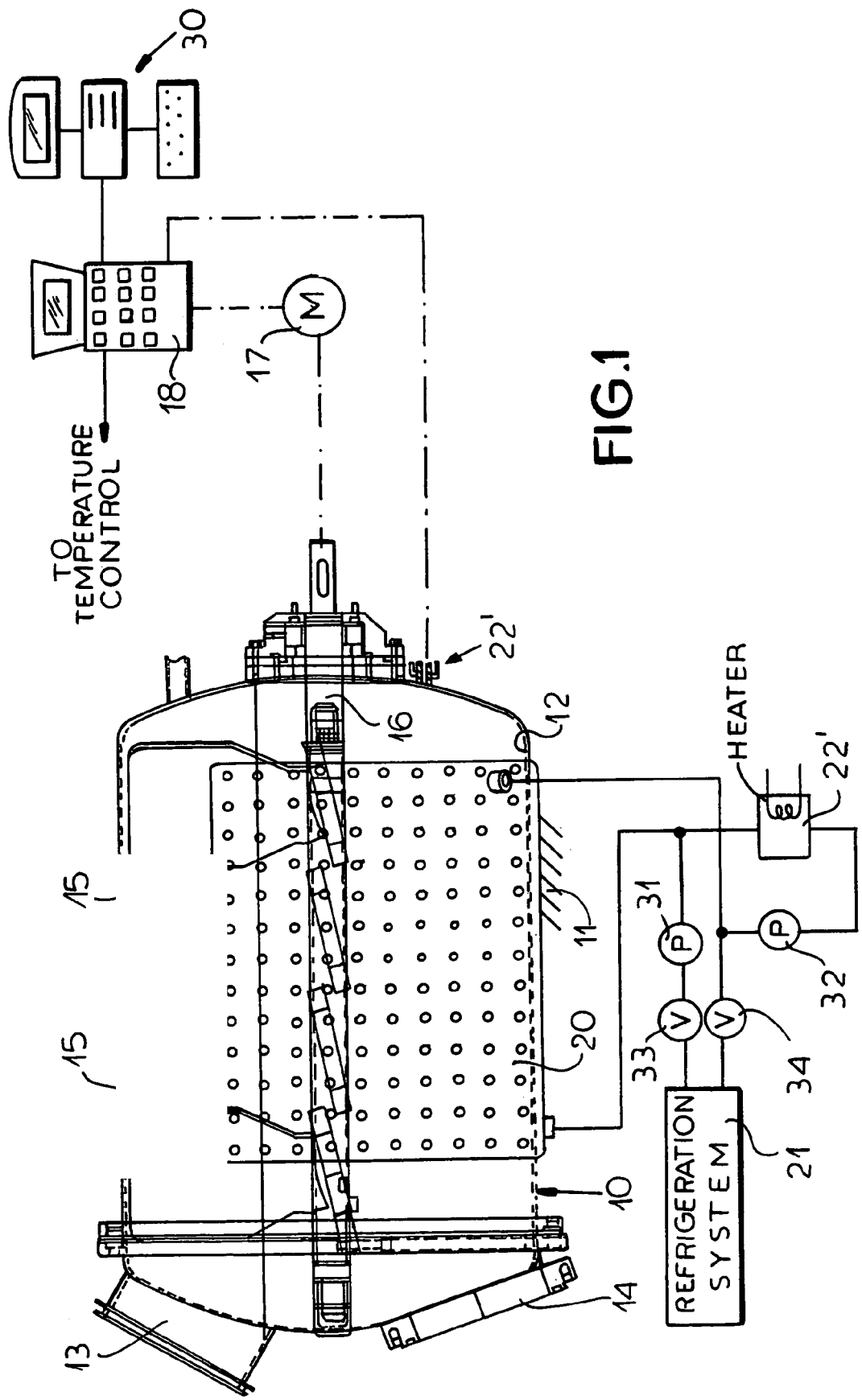
FIG. 1 is a cross sectional view of a massaging drum according to the invention equipped to carry out the processing of this invention.

While I have mentioned that the method of the invention can be practiced with any type of agitator and that the bodies of meat which are processed can be contacted with the treating liquid, which can be any liquid which is to be distributed in the meat, preferably I use a massager of the type marketed by WTI Inc. under the name Polar Massager and which can have a construction similar to that shown in FIG. 1.

The liquid is assumed to have been previously injected into the meat. The polar massager 10 can be mounted on a support represented only diagrammatically at 11 and can comprise a stationary massager drum 12 with an inlet shoot 13 for the pieces of meat and an outlet shoot 14 from which the meat is discharged.

Within the drum 12, there are a number of paddles 15 mounted on a shaft 16 rotated by a drive 17 which can be controlled by the programmable computer 18 so that the torque, speed and variations thereof are controlled by the processing program. The drum or tank 12 has a jacket 20 which can be connected to a refrigeration system represented diagrammatically at 21 or to a heater 22 so that heated or chilled liquid is circulated through the jacket and the temperature of the meat is raised or lowered as it is processed in the massager.

A key to the method of the invention is that the elevated temperature at which the massaging is effected is maintained with considerable accuracy, say to ±2° F. and that is achieved, in accordance with one embodiment of the invention by contacting the bodies of meat within the massager directly with a temperature sensor. For that purpose, the temperature sensor 22 is mounted in a wall of the drum or tank in a position in which it is contacted by the bodies of meat as they are massaged.

Figure 2:
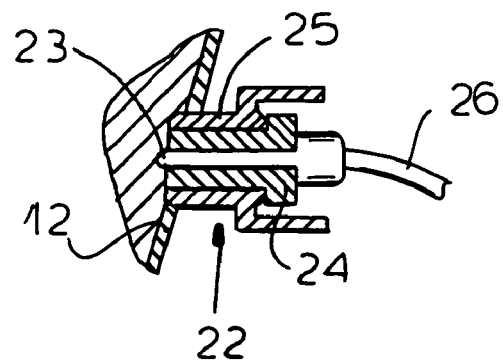
FIG. 2 is a detailed cross sectional view of a temperature measurement assembly for the massager.

As can be seen from FIG. 2, the temperature sensor 22 has a sensing element 23 for contact with the service of the meat in the vessel and is surrounded by an insulating bushing 24 so that the wall temperature of the vessel will not effect the reading. The insulator bushing 24 can be affixed in the tank shell 12 by a mounting sleeve 25. The output cable 26 can be connected to the computer 18. The latter may surface a number of massagers and even other equipment utilized with such massagers such as the injectors or conveyors or the like and, of course, the temperature control system 21, 22. The computer 18 may in turn be connected to the computer terminals 30 by conventional networking.

As has been described, once the bodies of meat carrying the liquid are introduced into the massager, they are brought to an elevated temperature in the range of 45° F. to 60° F. and massaged until the liquid is fully absorbed. The heating of the massager is effected via the circulating liquid utilizing the heater 22, appropriate pumps 31, 32 and valves 33, 34 being provided so that selectively hot or cold liquid can be passed through the jacket of the vessel.

Once the massaging has been completed, usually in a period of 5 minutes to say an hour and a half, the meat can be chilled in the massager and discharged. The temperature control by sensor 22 permits the meat to be reproducibly discharged always at the same temperature which is a significant advantage.

Figure 3:
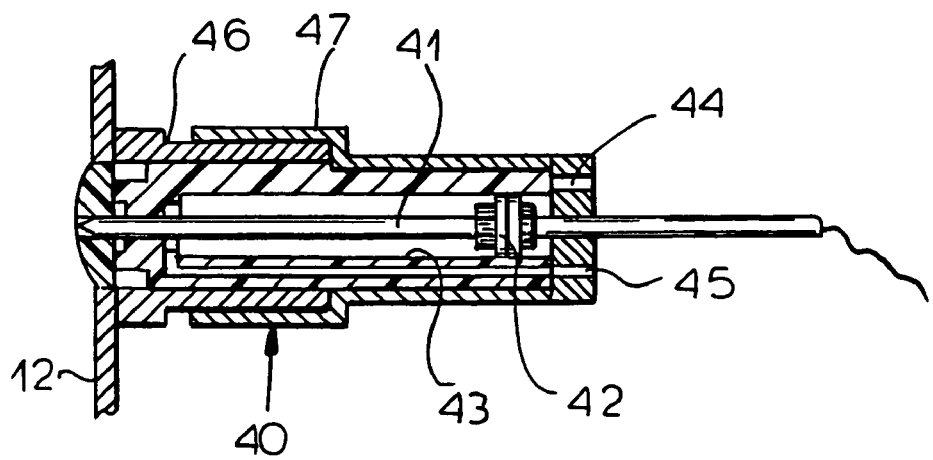
FIG. 3 is a cross sectional view of another temperature measuring device for use with the present invention.
Figure 4:
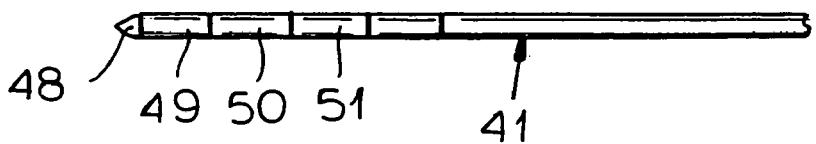
FIG. 4 is a detail of the temperature prove thereof.

In FIG. 3, I have shown another temperature probe 40 which can be mounted in the wall of the tank or drum and which has a temperature sensing needle 41 attached to be driven by a piston 42 into bodies of meat in the tank. For that purpose, the piston 22 is slidable in a cylinder 43 and a pressurizing fluid can be fed through either of the ports 44 or 45 to displace the piston 42 to the left or to the right within the cylinder 43 which is mounted by the bushings 46 and 47 on the tank wall. The needle 41 can have a tip sensor 48 and segmental sensors 49, 50, 51 etc. enabling the temperatures to be obtained from various depths within the body of the meat pierced by the needle. The computer 18 can respond to an average temperature or to temperatures measured close to the surface or deep within the body of meat as may be desired. To utilize the sensor of FIGS. 3 and 4, the paddles are brought to standstill.

EXAMPLE

Evaluation effects of hot and cold massaging on product quality

A mixture of lean pork leg (fresh ham) muscles (inside and outside), 5% port fat and curing ingredients were massaged at 32° F. and 55° F. Ham samples massaged at 55° F. had higher water holding capacity, firmer structure and better nitrite diffusion.

Materials and Methods

Lean pork leg (fresh ham) muscles (inside and outside) ground through kidney plate, pork fat ground through ⅛ inch plate and curing ingredients were obtained from the Meat Processing Laboratories at Kansas State University. Meat samples and fat were divided into two equal parts. First part was incubated at 32° F. and second part was incubated at 55° F. for 24 hr. Distilled water samples were incubated at 32 and 55° F. to make 12% pickle solution at corresponding temperatures.

Figure 5:
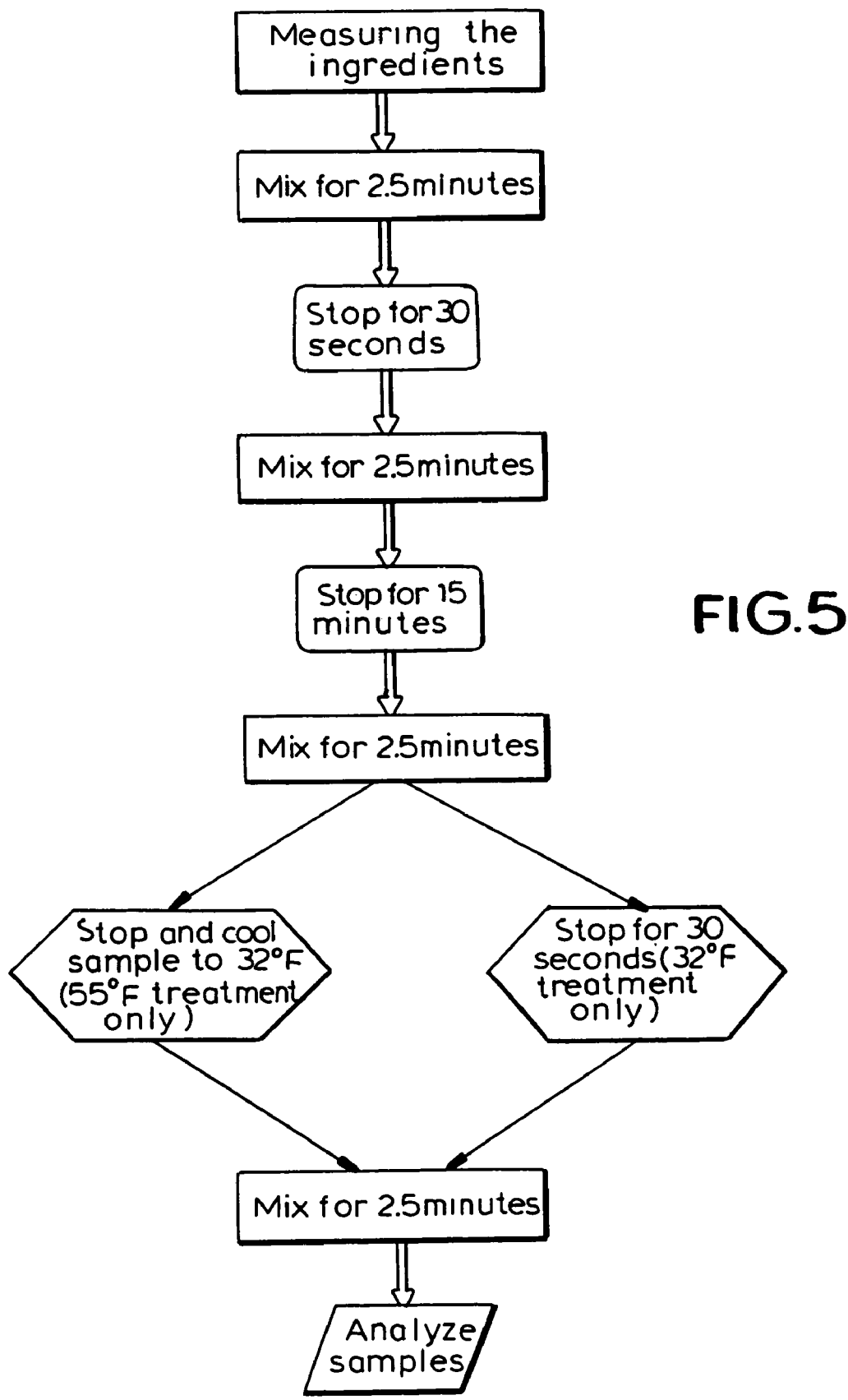
FIG. 5 is a flow diagram illustrating the example.

Equal amount of inside and outside muscles 5% pork fat, water and dry curing ingredients were measured (Table 1). Massaging of each treatment was performed as shown in the flow diagram (FIG. 5). After completion of massaging, water holding capacity

TABLE 1

| Curing ingredients | |
|---|---|
| Ingredients | Amount in meat block |
| Water | 12% |
| Salt (sodium chloride) | 2.0% |
| Sugar (dextrose) | 0.7% |
| Phosphate (sodium tripolyphosphate) | 0.4% |
| Sodium erythorbate | 0.055% |
| Sodium nitrite | 0.015% |

(WHC), textural properties and nitrite analysis were determined. The WHC of the samples were measured as described in the procedure of Grau and Hamm (1953). The meat sample (500 mg) was placed on Whatman No. 1 filter paper (15 cm diameter) humidified above saturated potassium chloride solution for 24 hr. Plexiglass plates (15 cm$^2$) were placed on/under the filter paper and pressed at 5,000 psi for 5 minutes. The WHC of samples were expressed as the ratio of total area to meat film area. The total and meat film areas were calculated using OPTIMAS™ image analysis program (Optimas Corporation, Bothell, Wash.). The texture profiles of the samples, firmness and resiliency, were measured using a TA.XT2 Texture Analyzer version 5.16 (Stable Micro System, Scarsdale, N.Y.). To determine the amount and/or diffusion of nitrite in the muscles, meat samples were taken from the geometrical center of the muscle pieces. Nitrite analysis of these samples were performed using the USDA nitrite analysis method for meat samples.

Results and Discussion

Water holding capacity was defined as the ratio of the total area to meat film area. A larger ratio represents a lower WHC. The samples massaged at 55° F. showed a higher WHC with a ratio of 1.58 while the samples massaged at 32° F. showed a lower WHC with a ratio of 1.98. Interpretation of texture profiles of the samples showed that the samples massaged at 55° F. had firmer texture (2664.48 g force) compared to the samples massaged at 32° F. (1677.48 g force). Nitrite analysis showed that the samples massaged at 55° F. had 46.67 ppm sodium nitrite while the samples massaged at 32° F. had 40 ppm sodium nitrite.

Results indicated that massaging action carried out at 55° F. resulted in higher water holding capacity, firmer structure and better diffusion of sodium nitrite compared to massaging action carried out at 32° F.

I claim:

1. A method of processing meat which comprises the steps of contacting bodies of meat with a treating solution; agitating said bodies of meat in contact with said treatment solution in an agitator at an elevated temperature for the bodies of meat of substantially 45° F. to 60° F. until said bodies of meat are substantially dry; and recovering said bodies of meat in a substantially dry state, wherein the step of recovering the bodies of meat further comprises the step of agitating the bodies of meat simultaneously with cooling the bodies of meat.

2. The method of claim 1 further comprising the step of controlling the temperature of the bodies of meat within ±2° F. during the agitation of the bodies of meat at an elevated temperature.

3. The method of claim 1 further comprising the step of maintaining the temperature of the bodies of meat at an elevated temperature substantially constant during the agitating step.

4. The method of claim 3 wherein the step of agitating the bodies of meat at an elevated temperature takes place for a period of time sufficient to distribute the treating solution in the bodies of meat.

5. The method of claim 3 wherein the step of maintaining the temperature of the bodies of meat substantially constant comprises directly measuring a temperature of the bodies of meat and adjusting the temperature of the agitator in response to a measured temperature of the bodies of meat.

6. The method of claim 5 wherein the step of directly measuring the temperature of the bodies of meat comprises contacting the bodies of meat in the agitator with a temperature sensor.

7. The method of claim 6 wherein the step of contacting the bodies of meat with a temperature sensor comprises inserting the temperature sensor into the bodies of meat.

8. The method of claim 1 wherein the bodies of meat are selectively heated and cooled in the agitator by selectively passing a heated or cooled fluid through a jacket secured to the agitator.

9. The method of claim 1 wherein the step of contacting the bodies of meat with the treating solution comprises injecting the bodies of meat with an inject at a temperature less than the elevated temperature.

10. The method of claim 9 wherein the temperature less than the elevated temperature is substantially 15° F. to 40° F. below the elevated temperature.

11. The method of claim 1 wherein the agitator is selected from the group consisting of a rotary paddle massager and a tumbler.

12. The method of claim 1 wherein the step of cooling the bodies of meat comprises reducing the temperature of the bodies of meat to a temperature less than the elevated temperature.

13. The method of claim 12 wherein the temperature less than the elevated temperature is substantially 15° F. to 40° F. below the elevated temperature.

14. A method of processing meat which comprises the steps of contacting bodies of meat with a treating solution; agitating said bodies of meat in contact with said treatment solution to maintain the bodies of meat at an elevated temperature of substantially 45° F. to 60° F. until said bodies of meat are substantially dry; and recovering said bodies of meat in a substantially dry state, wherein the step of recovering the bodies of meat further comprises the step of agitating the bodies of meat simultaneously with cooling the bodies of meat.

15. The method of claim 14 wherein the step of cooling the bodies of meat comprises reducing the temperature of the bodies of meat to a temperature substantially 15° F. to 40° F. below the elevated temperature.

* * * * *